July 29, 1930.  A. S. NEWMAN  1,771,651

FILM BOX FOR KINEMATOGRAPH CAMERAS

Filed June 19, 1928

Inventor
Arthur Samuel Newman
by Knight Bros
attorneys

Patented July 29, 1930

1,771,651

UNITED STATES PATENT OFFICE

ARTHUR SAMUEL NEWMAN, OF LONDON, ENGLAND, ASSIGNOR TO NEWMAN & SINCLAIR, LIMITED, OF LONDON, ENGLAND

FILM BOX FOR KINEMATOGRAPH CAMERAS

Application filed June 19, 1928, Serial No. 286,554, and in Great Britain June 21, 1927.

The invention relates to that kind of film box having a pin perpendicular to one of its sides to support a roll of film and a take-up roller on to which the film is wound after exposure, the axes of the said pin and take-up roller being parallel to each other and nearer together than the full diameter of the roll of film. In such apparatus the film passes out of the box and is drawn off the roll by means of a sprocket which sprocket returns the film to the take-up roller and this latter is also driven.

With such boxes the film is liable to move laterally, when subjected to vibration, causing friction between the edges of the film and the sides of the box. The film is also liable to unwind and bear against the narrow sides of the box. Such friction is especially detrimental in clockwork driven cameras.

The object of the present invention is to provide an improved box in which such friction is eliminated.

According to the present invention, in order to retain the roll of film with the edges of the film in two parallel planes, those sides of the box adjacent to the said parallel planes are each provided with guides. In one method of carrying the invention into effect the said guides are in the form of bars, radiating from the pin on which the roll is carried. The one set of bars is fixed. The other set has two fixed bars and one movable bar which can be fixed in two positions, namely with its outer face in the same plane as the outer faces of the other bars of the set or with its outer face bearing tightly against the roll of film and pressing the same against the opposite set of guides, thereby preventing the same unrolling.

The faces of the two sets of guide bars above described, when not clamping the roll of film, are nearer together than the flanges of the take-up spool thereby preventing the film from the roll coming into contact with said flanges which are moving in the opposite direction to the film passing out of the box.

The usual take-up roller is replaced by a spool with flanges sufficiently large in diameter to receive the whole of the roll of film between them.

The spool is made in two parts, each consisting of a central barrel and a flange. One of these parts is fixed upon a shaft adapted to rotate in a fixed bearing and said shaft, as usual, is provided at one end with a driver or clutch. The other and detachable part of the spool fits on to the barrel of the fixed part and is held thereon by the cover of the box bearing against a projection on its centre.

The spool being made in two parts allows the exposed film to be removed upon the said detachable part. The two parts of the spool are provided with co-operating means to ensure that they rotate at equal speeds. According to the preferred construction the detachable part of the spool is formed with a number of slots in the end of its barrel, one of which fits over a pin carried by the fixed part of the spool. A ratchet is provided to prevent the take-up spool running backwards.

The driving sprocket, according to the preferred construction, is partly within the box and feeds the film into a guide leading the film towards the gate. That portion of the film leaving the gate passes to the end of another guide leading the film back to the driving sprocket. These two guides are suitably curved to provide an easy path for the film and to prevent the direct admission of light to the box. These guides have a depressed central longitudinal part to prevent scratching the film and turned over edges to guide the same. Covers are clipped on to the said guides and a casing covers the two guides and sprocket.

The invention is illustrated in the accompanying drawings in which.

Figure 1:
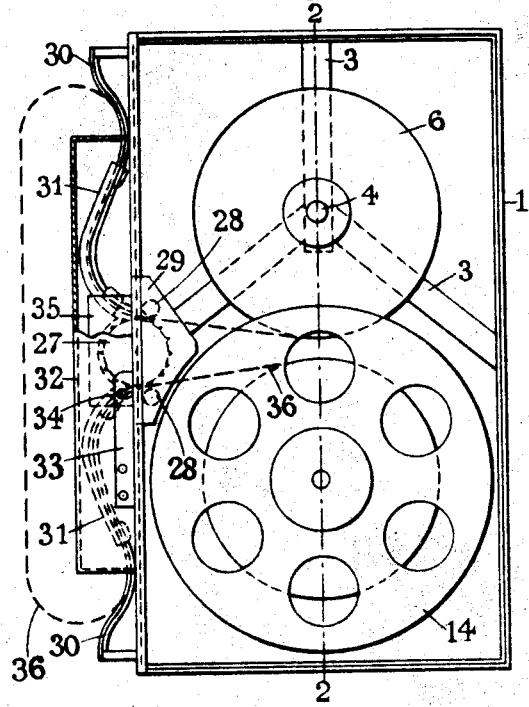
Fig. 1 is a side elevation of the box with the cover removed.
Figure 2:
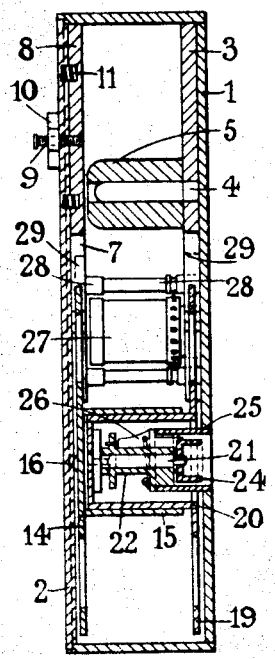
Fig. 2 is a section on the line 2—2 of Fig. 1 and through the cover of the box.
Figure 3:
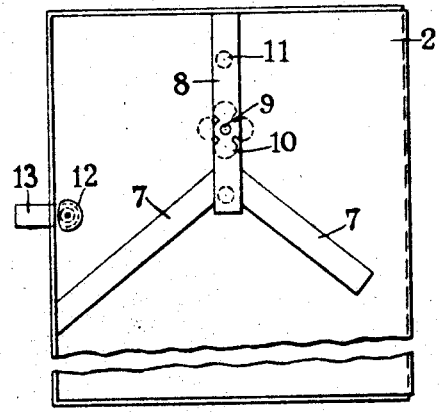
Fig. 3 is an interior view of the cover partly broken away.

As shown in the drawings, 1 is the body of the box and 2 is the cover of the same. One side of the box is provided in its interior with three fixed bars 3 radiating from the pin 4 on which the roller 5 is mounted said pin 4 being fixed to one side of the box and perpendicular thereto. The bars 3 form guides on one side of the box for the roll 6 of unexposed film.

Figure 4:
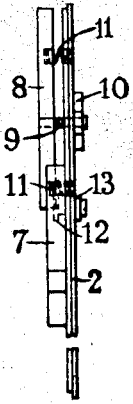
Fig. 4 is an edge view of the same.
Figure 5:
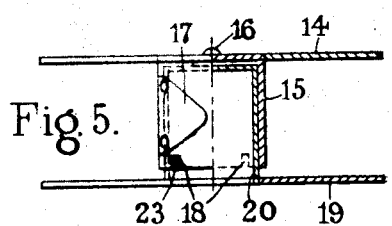
Fig. 5 is a composite view partly in elevation and partly in section of the take-up spool.
Figure 6:
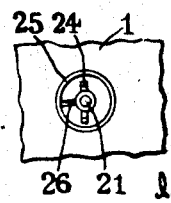
Fig. 6 is an elevation of part of one side of the box.

Upon the inside of the cover 2 there are two fixed bars 7, 7 and a movable guide bar 8 adapted to clamp the roll of unexposed film and prevent the same unrolling. The bar 8 has fixed thereto a bolt 9 which passes loosely through an aperture in the cover 2 and carries on its outer end a nut 10 adapted to be readily moved by hand by any suitable device passing through the camera casing. Such a device forms no part of the present invention and is therefore not shown. Between the bar 8 and the cover 2 are two coiled springs 11 which force the bar 8 away from the cover 2, as shown in Fig. 4, as the nut 10 is rotated in one direction.

It will be understood that as the nut 10 is rotated in the other direction the bar 8 is drawn towards the cover 2 and compresses the springs 11 within recesses in the bar 8 and cover 2, so that the outer face of the bar 8 is in the same plane as the outer faces of the two fixed bars 7, 7.

The cover 2 is provided with a suitable catch 12 adapted to engage with one side of the box. The catch 12 is rotated by a lever or handle 13 which is within the area of the cover when the catch is engaging the side of the box 1.

The take-up spool is made in two parts, and the detachable part consists of a flange 14 to which is fixed a hollow barrel 15. On the outer side of the flange 14 is a projection 16 at its centre, which comes into contact with the cover 2 of the box. The hollow barrel 15 carries a spring clip 17 beneath which is placed one end of the film. The hollow barrel 15 is formed with a number of slots 18 in its end.

The fixed part of the spool consists of a flange 19 having a barrel 20 and mounted upon a shaft 21 which rotates in a fixed bearing 22. The barrel 20 carries a pin 23 with which any of the slots 18 may engage when one part of the take-up spool is rotated with respect to the other part thereof. The engagement of the pin 23 with one of the slots 18 ensures that the two parts of the spool shall rotate as a single piece. It will be noticed that the inner faces of the flanges 14 and 19 are wider apart than the inner faces of the guides 3 and 7.

On the outer end of the shaft 21 is fixed a driver 24 which is shown with two arms, and is located within a housing 25, in which is fixed the bearing 22.

A ratchet 26 is carried by the fixed bearing 22, and is within the path of the two arms of the driver 24. The ratchet 26 is bevelled off on one edge to allow the driver 24 to rotate for taking up the film, but it prevents the driver rotating in the opposite direction and therefore prevents the spool rotating in the opposite direction, and consequently prevents the unwinding of the film.

The driving sprocket 27 is mounted partly within the body 1 of the box. On each side of the sprocket 27 is a roller 28 the ends of which are mounted within plates 29 fixed to one edge of the box. Outside the box are two fixed film guides 30 each having a depressed centre as is usual in guides for kinematograph films, and on to the exterior of these fixed film guides 30 is clipped a detachable cover 31. The greater part of the guides 30 and detachable cover 31 is covered by a detachable casing 32 which is connected in any suitable manner to the body 1 of the box.

In the construction shown in Fig. 1 of the drawings the casing 32 has riveted on opposite sides of its exterior two similar springs 33, only one of which is seen in Fig. 1, each having an aperture adapted to clip over a pin 34 carried by a plate 35 made integral with the plate 29 and located outside of the body 1 of the box.

In Fig. 1 the film, indicated by a dotted line 36, is seen to pass from the roll 6 into one of the fixed guides 30 and beneath its cover 31, and to emerge therefrom at one end. The film then passes through a suitable gate forming part of the camera into which the film box is placed, and is returned by a loop at the lower part into the lower fixed guide 30 and beneath the cover 31. From this last mentioned fixed guide the film is wound upon the barrel 15 of the detachable part of the spool.

The sprocket 27 draws the film 36 off the roll 6 and returns the film to the barrel 15.

The rollers 28 prevent the film rubbing against the edges of the two fixed guides 30 and retain the film upon the sprocket 27.

What I claim as my invention is:—

1. An improved film box for a kinematograph camera having in combination a box, a pin to support a roll of film, said pin being fixed to one interior side of the box and perpendicular thereto, fixed guides carried by the same side of the interior of the box for one edge of the film, a movable guide on the opposite interior side of the box for the other edge of the film, means operated from the exterior of the box for moving the movable guide towards and away from the fixed guides, and a flanged take-up spool, the inner faces of the flanges being wider apart than the inner faces of the fixed and movable guides, substantially as set forth.

2. An improved film box for a kinematograph camera having in combination a box, a pin to support a roll of film, said pin being fixed to one interior side of the box and perpendicular thereto, fixed guides carried by the same side of the interior of the box for one edge of the film, a movable guide on the opposite interior side of the box for the other edge of the film, means operated from the exterior of the box for moving the movable guide towards and away from the fixed guides, and a take-up spool made in two parts, each part consisting of a flange and a barrel, one barrel fitting over the other barrel, and the inner faces of the flanges being wider apart than the inner faces of the fixed and movable guides, substantially as set forth.

3. An improved film box for a kinematograph camera having in combination a box, a pin to support a roll of film, said pin being fixed to one side of the box and perpendicular thereto, fixed guides for one edge of the film on the same side of the interior of the box, a movable guide for the other edge of the film, a screw carried by the movable guide passing through an aperture in the opposite side of the box, a nut on the outer end of said screw and springs located between the movable guide and the adjacent side of the box, a take-up spool made in two parts, each part consisting of a flange and a barrel, one barrel fitting over the other barrel, and a projection on the outer side of the flange of the outer barrel which comes in contact with the interior of the box, substantially as set forth.

4. An improved film box for a kinematograph camera having in combination a box, a pin to support a roll of film, said pin being fixed to one side of the interior of the box and perpendicular thereto, a set of fixed bars, radiating from the pin, on the same side of the box to guide one edge of the film, fixed bars and a movable bar radiating from a point on the opposite side of the box, and means for moving the movable bar towards and away from the said set of fixed bars, a take-up spool made in two parts, each part consisting of a flange and a barrel, one barrel fitting over the other barrel, and a projection on the outer side of the flange of the outer barrel which comes in contact with the interior of the box, substantially as set forth.

5. An improved film box for a kinematograph camera having in combination a box, a pin to support a roll of film, said pin being fixed to one side of the box and perpendicular thereto, fixed guides for th edge of the film on the same side of the interior of the box, a movable guide, a screw carried by the movable guide passing through an aperture in the opposite side of the box, a nut on the outer end of said screw and springs located between the movable guide and the adjacent side of the box, a take-up spool made in two parts, each part consisting of a flange and a barrel, one barrel fitting over the other barrel, a driver for said take-up spool, and a ratchet to allow the diver to rotate in one direction only to take up the film, said driver and said ratchet being located within the inner barrel, substantially as set forth.

6. An improved film box for a kinematograph camera having in combination a box, a pin to support a roll of film, said pin being fixed to one side of the interior of the box and perpendicular thereto, a set of fixed bars, radiating from the pin, on the same side of the box to guide one edge of the film, fixed bars and a movable bar radiating from a point on the opposite side of the box, and means for moving the movable bar towards and away from the said set of fixed bars, a take-up spool made in two parts, each part consisting of a flange and a barrel, one barrel fitting over the other barrel, a driver for said take-up spool, and a ratchet to allow the driver to rotate in one direction only to take up the film, said driver and said ratchet being located within the inner barrel, substantially as set forth.

7. An improved film box for a kinematograph camera having in combination a box, a pin to support a roll of film, said pin being fixed to one side of the box and perpendicular thereto, fixed guides for the edge of the film on the same side of the interior of the box, a movable guide, a screw carried by the movable guide passing through an aperture in the opposite side of the box, a nut on the outer end of said screw and springs located between the movable guide and the adjacent side of the box, a take-up spool made in two parts, each part consisting of a flange and a barrel, one barrel fitting over the other barrel, and the inner faces of the flanges being wider apart than the inner faces of the fixed and movable guides, substantially as set forth.

8. An improved film box for a kinematograph camera having in combination a box, a pin to support a roll of film, said pin being fixed to one side of the interior of the box and perpendicular thereto, a set of fixed bars, radiating from the pin, on the same side of the box to guide one edge of the film, fixed bars and a movable bar radiating from a point on the opposite side of the box, and means for moving the movable bar towards and away from the said set of fixed bars, a take-up spool made in two parts, each part consisting of a flange and a barrel, one barrel fitting over the other barrel, and the inner faces of the flanges being wider apart than the inner faces of the fixed and movable guides, substantially as set forth.

9. An improved film box for a kinematograph camera having in combination a box, a pin to support a roll of film, said pin being fixed to one side of the box and perpendicular thereto, fixed guides for the edge of the film on the same side of the interior of the box, a movable guide, a screw carried by the movable guide passing through an aperture in the opposite side of the box, a nut on the outer end of said screw and springs located between the movable guide and the adjacent side of the box, a take-up spool made in two parts each consisting of a flange and a barrel, one barrel fitting over the other barrel, a projection on the outer side of the flange of the outer barrel which comes into contact with the interior of the box, a driver for said take-up spool and a ratchet to allow the driver to rotate in one direction only to take up the film, said driver and said ratchet being located within the inner barrel, the inner faces of said flanges being wider apart than the inner faces of the fixed and movable guides, substantially as set forth.

10. An improved film box for a kinematograph camera having in combination a box, a pin to support a roll of film, said pin being fixed to one interior side of the box and perpendicular thereto, fixed guides for one edge of the film carried by and projecting from the same side of the interior of the box, a movable guide on the opposite interior side of the box for the other edge of the film, means operated from the exterior of the box for moving the movable guide towards and away from the fixed guides, and a take-up spool, substantially as set forth.

11. An improved film box for a kinematograph camera having in combination a box, a pin to support a roll of film, said pin being fixed to one side of the box and perpendicular thereto, fixed guides for one edge of the film on the same side of the interior of the box, a movable guide for the other edge of the film, a screw carried by the movable guide passing through an aperture in the opposite side of the box, a nut on the outer end of said screw, springs located between the movable guide and the adjacent side of the box, and a take-up spool, substantially as set forth.

12. An improved film box for a kinematograph camera having in combination a box, a pin to support a roll of film, said pin being fixed to one side of the interior of the box and perpendicular thereto, a set of fixed bars, radiating from the pin, on the same side of the box to guide one edge of the film, fixed bars and a movable bar radiating from a point on the opposite side of the box, means for moving the movable bar towards and away from the said set of fixed bars, and a take-up spool, substantially as set forth.

13. An improved film box for a kinematograph camera having in combination a box, a pin to support a roll of film, said pin being fixed to one side of the box and perpendicular thereto, fixed guides for the edge of the film on the same side of the interior of the box, a movable guide, a screw carried by the movable guide passing through an aperture in the opposite side of the box, a nut on the outer end of said screw and springs located between the movable guide and the adjacent side of the box, a take-up spool made in two parts, namely an inner part and an outer part, the latter fitting over the former, means within the inner part for driving the spool in one direction, and for preventing the spool rotating in the opposite direction, a sprocket partly within and partly without the box for driving the film, curved light tight guides outside the box to lead the film from the said sprocket to the outside of the box and from the outside of the box back to said sprocket, substantially as set forth.

In witness whereof I have hereunto set my hand.

ARTHUR SAMUEL NEWMAN.